United States Patent [19]
Holden

[11] 3,768,535

[45] Oct. 30, 1973

[54] TIRE TREAD

[76] Inventor: Ernest L. Holden, 3013 W. Port-au-Prince Ln., Phoenix, Ariz. 85023

[22] Filed: Dec. 3, 1971

[21] Appl. No.: 204,440

Related U.S. Application Data

[63] Continuation-in-part of Ser. No. 238,026, Sept. 7, 1971, abandoned.

[52] U.S. Cl. .......................................... 152/209 R
[51] Int. Cl. ............................................ B60c 11/06
[58] Field of Search ................................ 152/209 R

[56] References Cited
UNITED STATES PATENTS

| | | | |
|---|---|---|---|
| 3,000,421 | 9/1961 | Hack et al. | 152/209 R |
| 3,532,147 | 10/1970 | Gough et al. | 152/209 R |

*Primary Examiner*—James B. Marbert
*Attorney*—William H. Drummond

[57] ABSTRACT

A tire tread employing a groove configuration shaped and positioned on the tire so that its edges maintain the groove open under load and stress conditions.

2 Claims, 30 Drawing Figures

PATENTED OCT 30 1973 3,768,535

INVENTOR
ERNEST L. HOLDEN
BY
ATTORNEY

← LOAD

← LOAD

← LOAD

← LOAD

← ROTATION

← ROTATION

← ROTATION

← ROTATION

INVENTOR
ERNEST L. HOLDEN

BY
ATTORNEY

TIRE TREAD

This application is a continuation-in-part of my prior filed co-pending application Ser. No. 238,026, filed Sept. 7, 1971, now abandoned.

BACKGROUND OF THE INVENTION

This invention relates to vehicle tires and more particularly to an improved tire tread which by virtue of its tread design greatly increases the tire's adhesion, especially in the presence of loose particles or lubricants on the highway or race track.

FIELD OF THE INVENTION

This invention is particularly directed to automobile tires and more particularly to a new and improved tire tread groove which under load and stress remains open to aid in gripping the ground or pavement.

Poor adhesion of vehicle tires is caused mainly by the presence of loose particles or oil, water, mud and the like on the road or track surface, these substances acting as lubricants and preventing adequate frictional engagement between the tire and the surface.

DESCRIPTION OF THE PRIOR ART

To gain traction under adverse conditions, such as loose particles or lubricants on the highway or race track, the prior art relies on tire tread designs which are designed to squeeze water, oil, mud and the like out of the tire tread to prevent skidding. In so doing, the sides of the grooves forming the tread squeeze together, thereafter rendering the tread of the tire ineffective in controlling skids.

SUMMARY OF THE INVENTION

In accordance with the invention claimed a new and improved tire tread is provided which is designed so that under load it presents an effective "biting edge" of each groove to the road. This open edge is effective because as a sharp edge, when in contact with the road surface, it functions to put substantial pound per square inch pressure onto the road surface, thereby digging through any loose surface material or lubricants under the tire and contacting the packed or dry surface below to prevent skidding. An example in racing is the universal use of narrower tires on wet tracks than on dry ones because a smaller area of rubber in contact with the road increases the poundage per square inch and digs through the lubricant.

It is, therefore, one object of this invention to provide a new and improved tire tread construction.

Another object of this invention is to provide a new and improved tire in which resilient parallel rib tread members along at least a part of the tire ground engaging surface form grooves which remain open under load and stress to more effectively grip a hard road surface or to bite into a dirt road surface.

A further object of this invention is to provide a tire tread formed by grooves having one side inclined, the other side being substantially perpendicular to the ground engaging surface of the tire; thus creating a wide groove top which gradually narrows to the bottom. This wide when new, narrow when worn groove perfectly adapts itself to a dirt race track, which is very loose at the start, gradually getting harder and more packed toward the end of the event.

A still further object of this invention is to provide a tire tread formed by grooves, the trailing wall of each groove being at an incline to the ground engaging surface of the tire, and the leading wall being substantially perpendicular to said surface.

A still further object of this invention is to provide a tire tread with grooves that remain open even in a worn condition when under load; a particular advantage being that late in a vehicle racing event when lubricant has been spilled by contestants onto a packed surface an open biting edge is still presented to the track surface and can, as a focal point of many pounds per square inch of pressure, dig through the lubricant to contact the dry, higher friction surface beneath.

Further objects and advantages of the invention will become apparent as the following description proceeds and the features of novelty which characterize this invention will be pointed out with particularity in the claims annexed to and forming part of the specification.

DESCRIPTION OF THE PREFERRED EMBODIMENT

Figure 1:
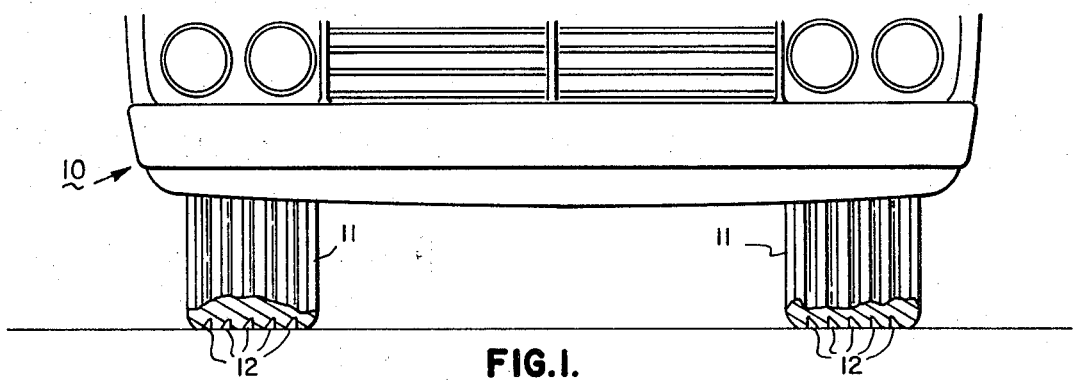
FIG. 1 is a partial front end view of a vehicle showing its front tires partly in cross-section and embodying the invention.
Figure 2:
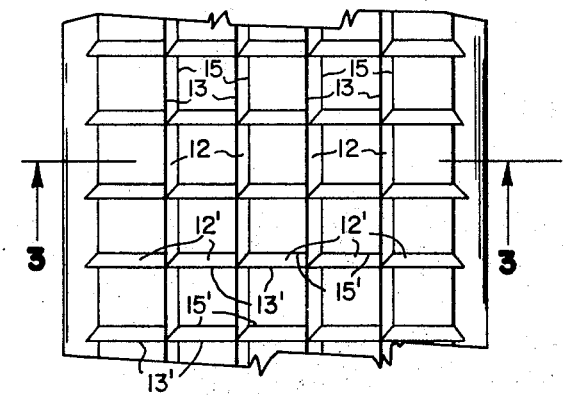
FIG. 2 is an enlarged fragmentary plan view of the tread portion of a vehicle tire.
Figure 3:
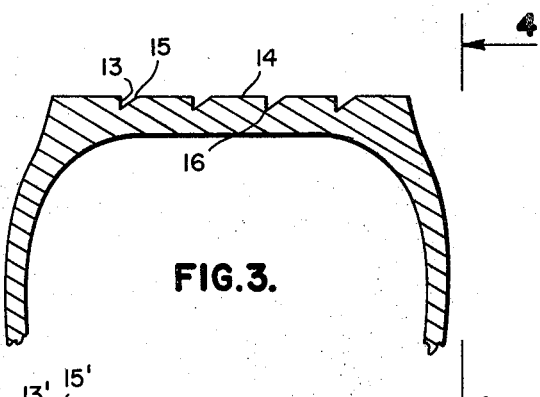
FIG. 3 is a sectional view taken on the line 3—3 of FIG. 2 in the direction of the arrows.
Figure 4:
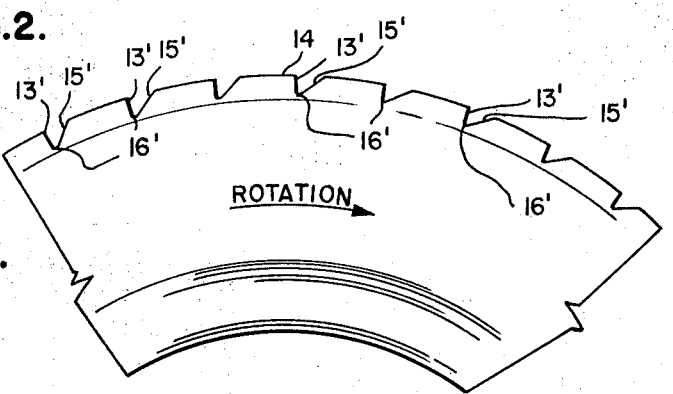
FIG. 4 is an enlarged fragmentary side elevational view of FIG. 3 taken along the line 4—4 in the direction of the arrows.
Figure 5:
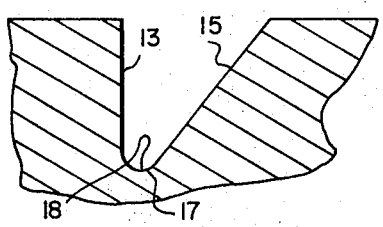
FIG. 5 is an enlarged cross-sectional view of a modification of the grooves shown in FIGS. 1-4 illustrating that the inverted crest of the groove is of an arcuate configuration.

Referring more particularly to the drawing by characters of reference, FIG. 1 discloses a partial front view of a passenger vehicle such as a conventional automobile 10 having a pair of identically grooved tires 11 mounted on the front axle, not shown. Each tire is provided with a plurality of grooves 12 extending circumferentially around the tires and embodying the invention. The grooves 12, as shown in FIGS. 2 and 3, are each formed by a straight upright side 13 extending substantially perpendicular to surface 14 which is the ground engaging surface of the tire and a side 15 which angles obliquely to surface 14 from the inner end 16 of side 13. As shown in FIG. 3, the bottom of the groove may be a substantially pointed configuration or the two sides 13 and 15 may form an arcuate configuration 17 shown in FIG. 5 or they may form a substantially flat bottom surface. The rounded or arcuate configuration 17 aids in preventing cracking of the rubber near the bottom 18 of the grooves when the tire is under stress, and the width of this groove base will vary with a groove's width relative to its depth, and with the angle of side 15. FIGS. 2 and 4 illustrate grooves 12' extending laterally across the surface 14 of a vehicle tire which is characteristic of the tire tread design used on the rear tires of a vehicle. This tire design employs the lateral grooves which are not necessarily effective on the front tires or non-driving axles, and having sides 13' and 15' of the design configuration described for grooves 12 of FIGS. 1 and 3. The lateral grooves 12' of FIGS. 2 and 4 may have a bottom configuration as shown in FIG. 5. It should be recognized that tires 11 may be grooved with or without the lateral grooves 12' and embody the benefits of this invention.

Figure 6:
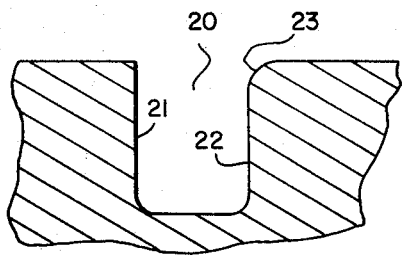
FIG. 6 is a further modification of the grooves shown in FIGS. 1-5 wherein the groove is of a U-shaped configuration wherein the trailing edge of the groove is rounded off.

Although grooves 12 and 12' are shown as comprising sides 13, 15 and 13', 15', engaging each other obliquely, the grooves may be formed in tire 11 of the U-shaped configuration 20 shown in FIG. 6 having sides 21 and 22 with the trailing edge 22 removed at 23. Although this U-shaped configuration is not a preferred embodiment, it does provide some of the benefits provided by groove configurations 12 and 12' as hereinafter described.

Figure 7:
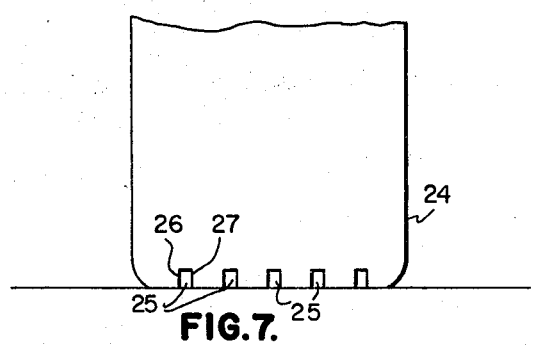
FIG. 7 is a schematic view of a conventional prior art right front tire of a passenger vehicle looking head on without sideward thrust.
Figure 8:
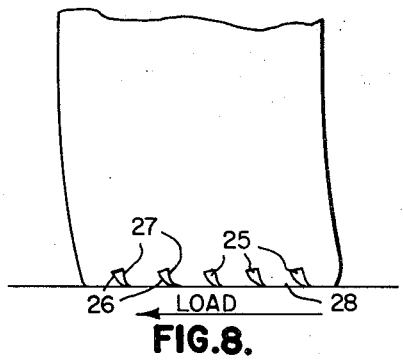
FIG. 8 is a view of the tire shown in FIG. 7 under sideward thrust in the direction shown.

When passenger vehicles are provided with tires 24 having conventional U-shaped grooves 25 as shown in FIG. 7, the grooves sides 26 and 27 at tire surface 28 substantially engage each other and close the groove under sideward thrust in the direction of the arrow shown in FIG. 8. This groove in the condition shown in FIG. 8 is no longer effective to grip the surfaces of the road, whether paved or dirt surfaced. Thus, before the movement of the vehicle in a sideward direction has stopped, the groove has lost its effectiveness and the tire surface is effectively a smooth continuous surface 28.

Figure 9:
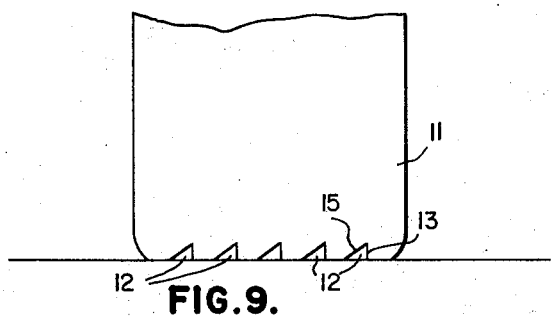
FIG. 9 is a schematic view of a right front tire of a passenger vehicle looking head on and embodying grooves of the disclosed invention without sideward thrust.
Figure 10:
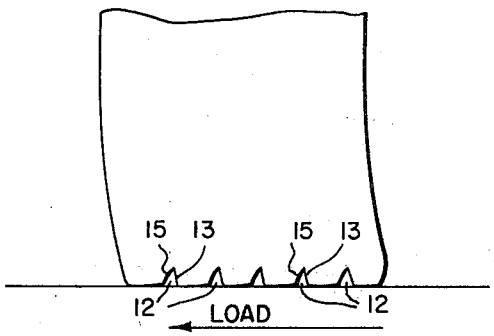
FIG. 10 is a view of the tire shown in FIG. 9 under sideward thrust in the direction shown.

FIG. 9 illustrates how the grooves 12 of the tires 11 embodying the invention look under normal forward movement of the vehicle. FIG. 10 illustrates how these grooves look under sideward thrust in the direction of the arrow. As noted from FIG. 10 the sides 13 and 15 at the tire surface 14 are open and the biting edge is able to grip the road surface.

Sides 13 and 13' of grooves 12 and 12' form biting edges of the tread configuration.

Figure 11:
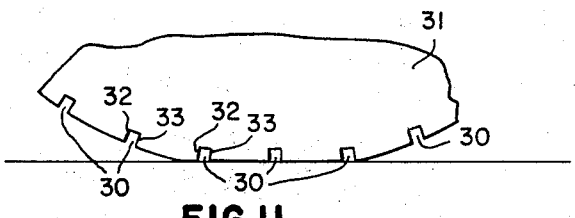
FIG. 11 is a fragmentary side view of a conventional vehicle tire showing grooves laterally across the tire.
Figure 12:
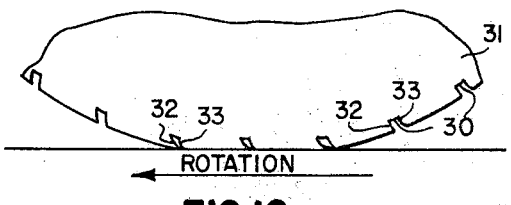
FIG. 12 is a view of the tire fragment shown in FIG. 11 under the weight of the vehicle in the direction of the tire rotation shown.

FIG. 11 illustrates a conventional groove 30 extending laterally across a conventional vehicle tire 31 of the prior art. Under rotation of the tire in the direction shown in FIG. 12 the sides 32 and 33 of the groove 30 close the groove under load to effectively destroy the action of the grooves.

Figure 13:
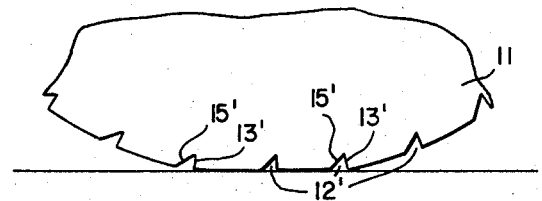
FIG. 13 is a fragmentary view of a tire for a vehicle embodying a groove of the invention extending laterally across the tire.

FIG. 13 illustrates how groove 12' of tire 11 looks under no load. Its sides 13' and 15' create an open-mouthed groove for gripping the road and particularly a loose or wet surface.

Figure 14:
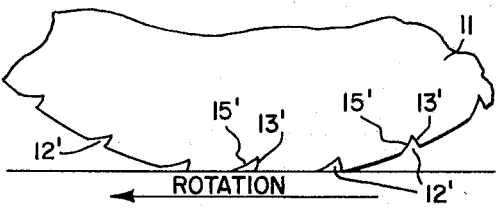
FIG. 14 is a view of the tire fragment shown in FIG. 13 under weight of the vehicle in the direction of the tire rotation shown.

In FIG. 14 under load and rotation of tire 11 as shown, the sides 13' and 15' of groove 12' remain open. This improved groove provides more traction than the prior art groove shown in FIGS. 7, 8, 11 and 12 since the biting edge is in open contact with the road surface, and becomes the focal point of many pounds per square inch of pressure, which digs through loose or wet surfaces to greatly raise the coefficient of friction when this biting edge contacts the packed or dry surface.

Figure 15:
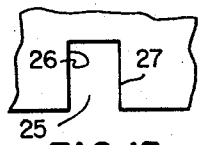
FIG. 15 is a cross-sectional view of a groove in a conventional racing vehicle tire extending around the circumference of the tire.
Figure 16:
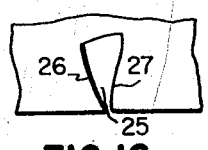
FIG. 16 is a view of FIG. 15 showing the groove under load or weight of the vehicle in the direction shown.
Figure 17:
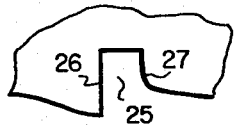
FIG. 17 is a view of the groove shown in FIG. 15 illustrating the groove in a worn condition.
Figure 18:
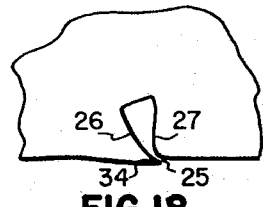
FIG. 18 is a view of the groove shown in FIG. 17 under load or weight of the vehicle in the direction shown.

FIG. 15 shows an enlarged illustration of the prior art groove 25 of FIG. 7 with FIG. 16 showing the groove under load conditions. FIG. 17 shows the groove 25 of FIG. 15 in a tire worn condition with FIG. 18 showing the same worn groove under load conditions. It should be noted that groove 25 closes more tightly as it wears with the lip 34 of side 26 overlapping the opening of the groove and completely covering the biting edge, rendering it ineffective.

Figure 19:
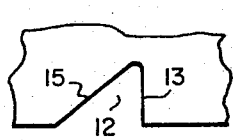
FIG. 19 is a cross-sectional view of one of the grooves of the invention around the circumference of a tire showing the groove in unloaded condition.
Figure 20:
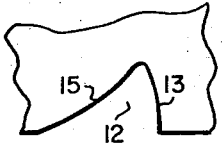
FIG. 20 is a cross-sectional view of the groove shown in FIG. 19 under load or weight of the vehicle in the direction shown.
Figure 21:
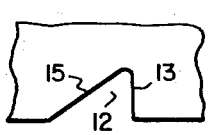
FIG. 21 is a view of the groove shown in FIG. 19 illustrating the groove in a worn condition.
Figure 22:
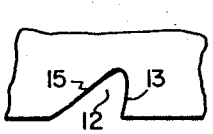
FIG. 22 is a view of the groove shown in FIG. 21 under load or weight of the vehicle in the direction shown.

FIG. 19 illustrates this groove under load conditions. FIG. 21 shows groove 12 under tire worn conditions. FIG. 22 shows the same worn tire 11 with an illustration of how groove 12 would look. It should be noted that in both tire new and tire worn conditions, groove 12 remains open to effectively grip the road.

FIG. 21 illustrates how the groove looks in a worn condition, non-loaded. It should be noted that the groove wears in such a manner that it keeps substantially its same geometrical configuration as it had when originally formed. FIG. 22 illustrates how groove 12 looks in a worn condition under load. The groove again remains open under load, leaving the biting edge able to effectively grip the road surface, whether paved or dirt, rough or smooth.

Figure 23:
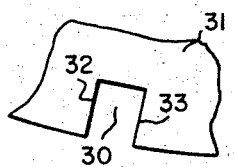
FIG. 23 is a cross-sectional view of a groove that extends laterally across a racing vehicle tire of the prior art.
Figure 24:
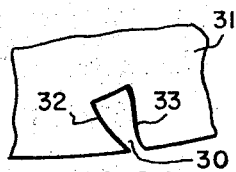
FIG. 24 is a view of FIG. 23 showing the groove under load or weight of the vehicle in the direction shown.

FIG. 23 is an enlarged cross-sectional view of the conventional groove 30 shown in FIG. 11 extending laterally across the tire 31. FIG. 24 shows this same groove under load conditions.

Figure 25:
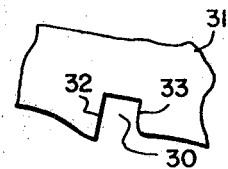
FIG. 25 is a view of the groove shown in FIG. 23 illustrating the groove in a worn condition.
Figure 26:
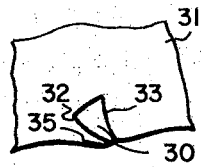
FIG. 26 is a view of the groove shown in FIG. 25 under load or weight of the vehicle in motion in the direction of rotation shown.

FIG. 25 illustrates groove 30 in a worn condition, while FIG. 26 shows the worn groove under load conditions. It should be noted that the lip 35 of one of the sides of groove 30 covers the groove opening, thereby presenting substantially a smooth tire road engaging surface, with no effective biting edge.

Figure 27:
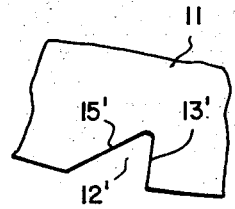
FIG. 27 is a cross-sectional view of one of the grooves of the invention laterally across the tire in an unloaded condition.
Figure 28:
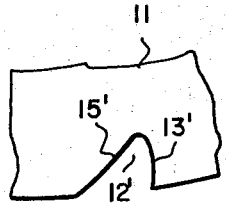
FIG. 28 is a cross-sectional view of the groove shown in FIG. 27 under load or weight of the vehicle in the direction of rotation shown.

FIG. 27 is an enlarged cross-sectional view of groove 12' showing the groove as originally formed, while FIG. 28 shows how this groove looks under load conditions.

Figure 29:
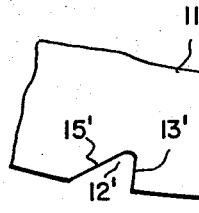
FIG. 29 is a view of the groove shown in FIG. 27 illustrating the groove in a worn condition.
Figure 30:
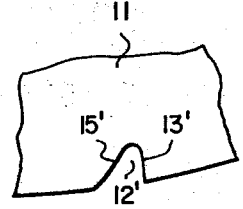
FIG. 30 is a view of the groove shown in FIG. 29 under load or weight of the vehicle in the direction of the rotation shown.

FIG. 29 shows groove 12' in a worn condition, while FIG. 30 shows the groove in worn condition under load conditions.

It should be recognized that one or more circumferentially spaced grooves 12 may be used on the vehicle tires, such as passenger tires, with the remaining prior art grooves being positioned at the other positions on the tire on the vehicle to grip the road on sideward movement of the vehicle.

Although but a few embodiments of the present invention have been illustrated and described, it will be apparent to those skilled in the art that various changes and modifications may be made therein without departing from the spirit of the invention or from the scope of the appended claims.

I claim:

1. In a vehicle tire, said tire including
an annular tire body,
a deformable road-contacting treat surface formed around the periphery of said tire body, and
a plurality of laterally spaced grooves extending circumferentially around said tread surface,
the improvement providing increased resistance to lateral displacement of the tread surface with respect to the road surface, against a force tending to induce such displacement, said improvement comprising:
  means defining at least one such circumferential groove, said means including
    a. a first side wall of said circumferential groove, formed in said tread surface and extending substantially perpendicularly inwardly thereof, forming a first intersection with said tread surface; and
    b. a second side wall of said circumferential groove, formed in said tread surface and extending inwardly thereof, said second side wall forming a second intersection with said tread surface and diverging at said second intersection from said first side wall,
whereby, when said tread surface deforms under said displacing force, said intersections remain spaced apart, leaving a biting edge exposed to resist said displacement.

2. Vehicle tire of claim 1 having means defining a plurality of circumferentially spaced laterally extending grooves formed in said tread surface, said means defining each of said laterally extending grooves, including
    a. a first side wall of said laterally extending groove, formed in said tread surface and extending substantially perpendicularly inwardly thereof, forming a first intersection with said tread surface; and
    b. a second side wall of said laterally extending groove, formed in said tread surface and extending inwardly thereof, said second side wall forming a second intersection with said tread surface and diverging at said second intersection from said first side wall.

* * * * *

Corrected Disclaimer and Dedication 3,768,535.—*Ernest L. Holden*, Phoenix, Ariz. TIRE TREAD. Patent dated Oct. 30, 1973. Disclaimer and dedication filed Mar. 27, 1975, by the inventor.

Hereby disclaims and dedicates to the Public the remaining term of said patent.

[*Official Gazette October 21, 1975.*]